United States Patent Office 3,606,810
Patented Sept. 21, 1971

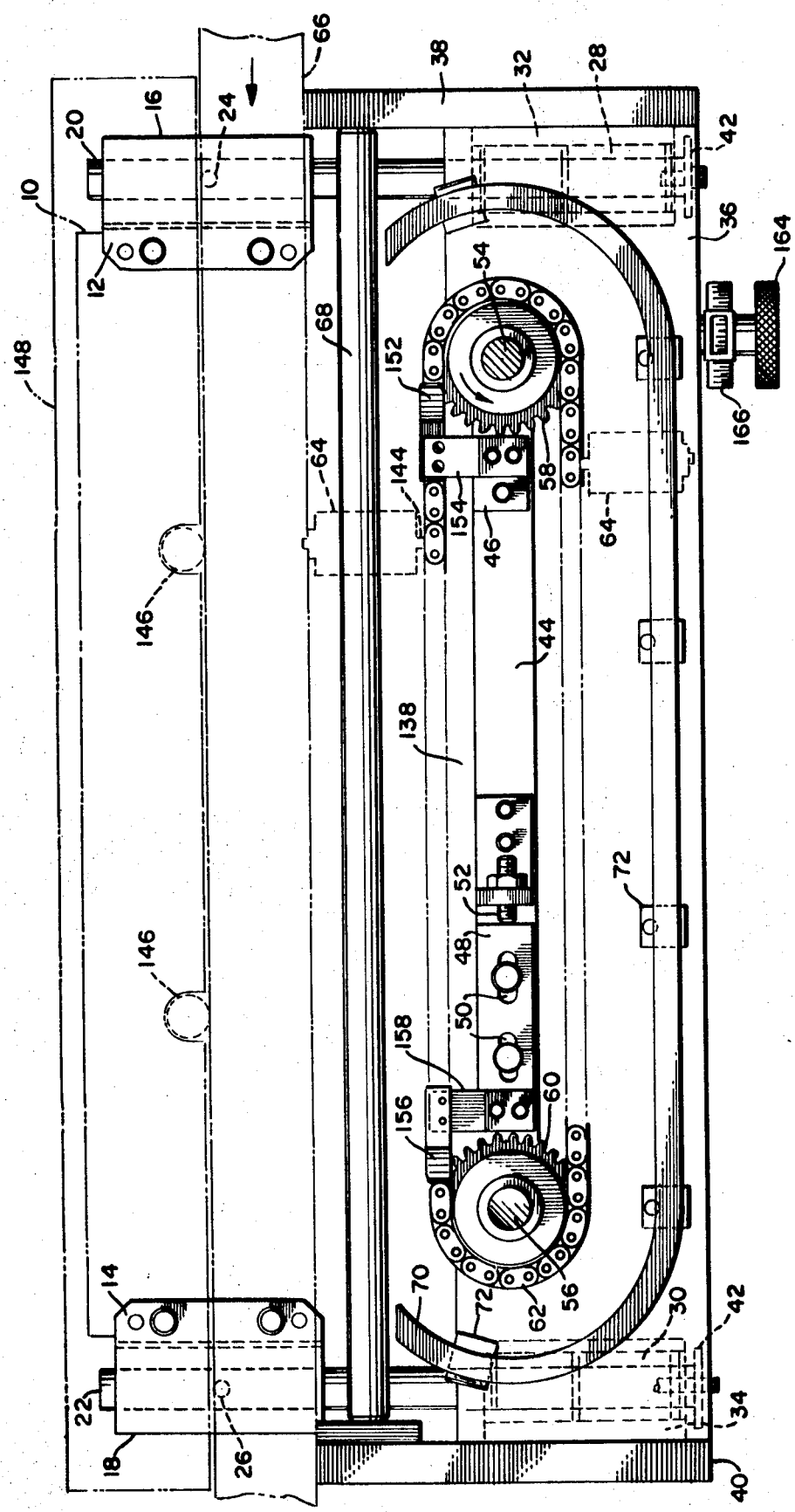

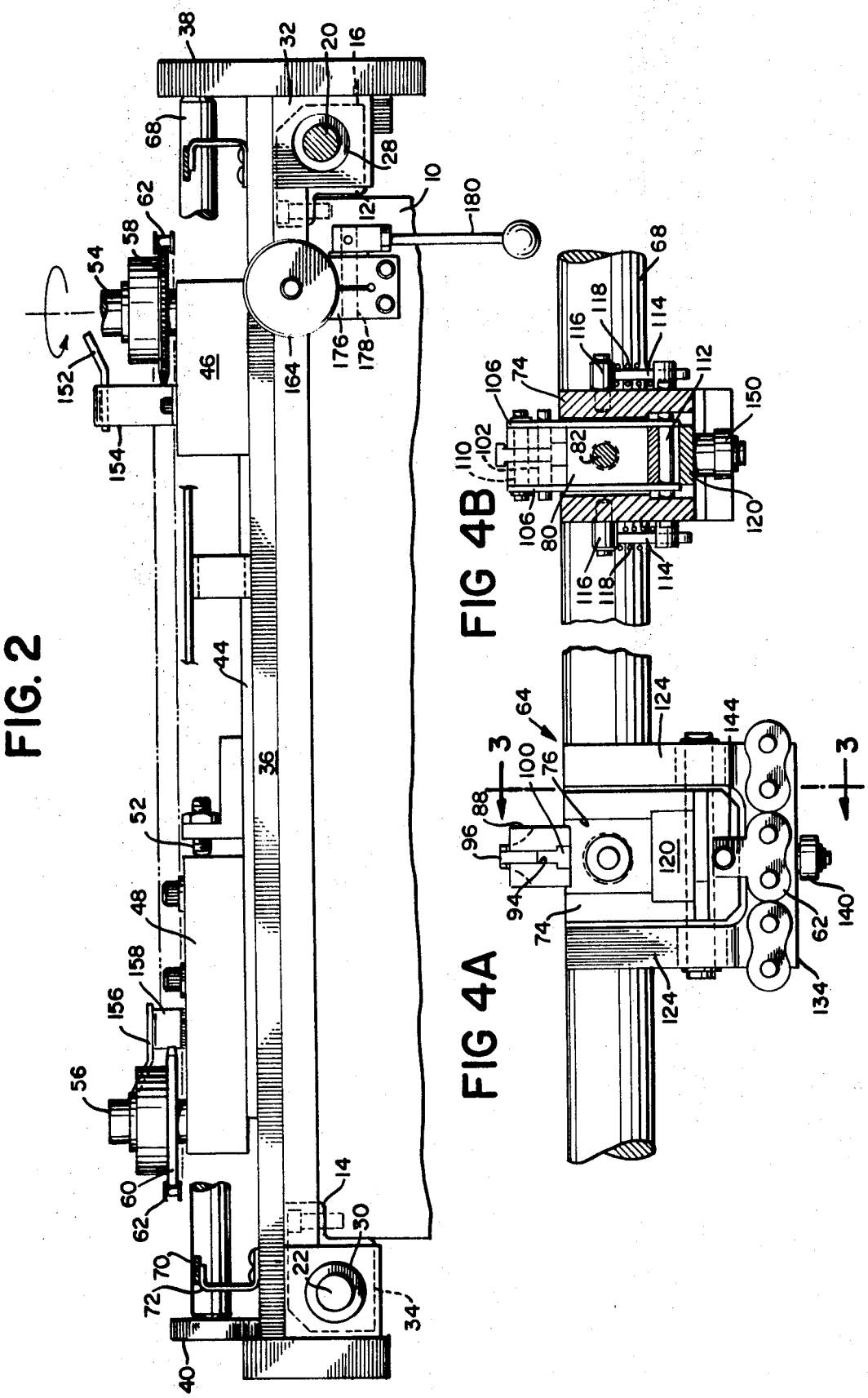

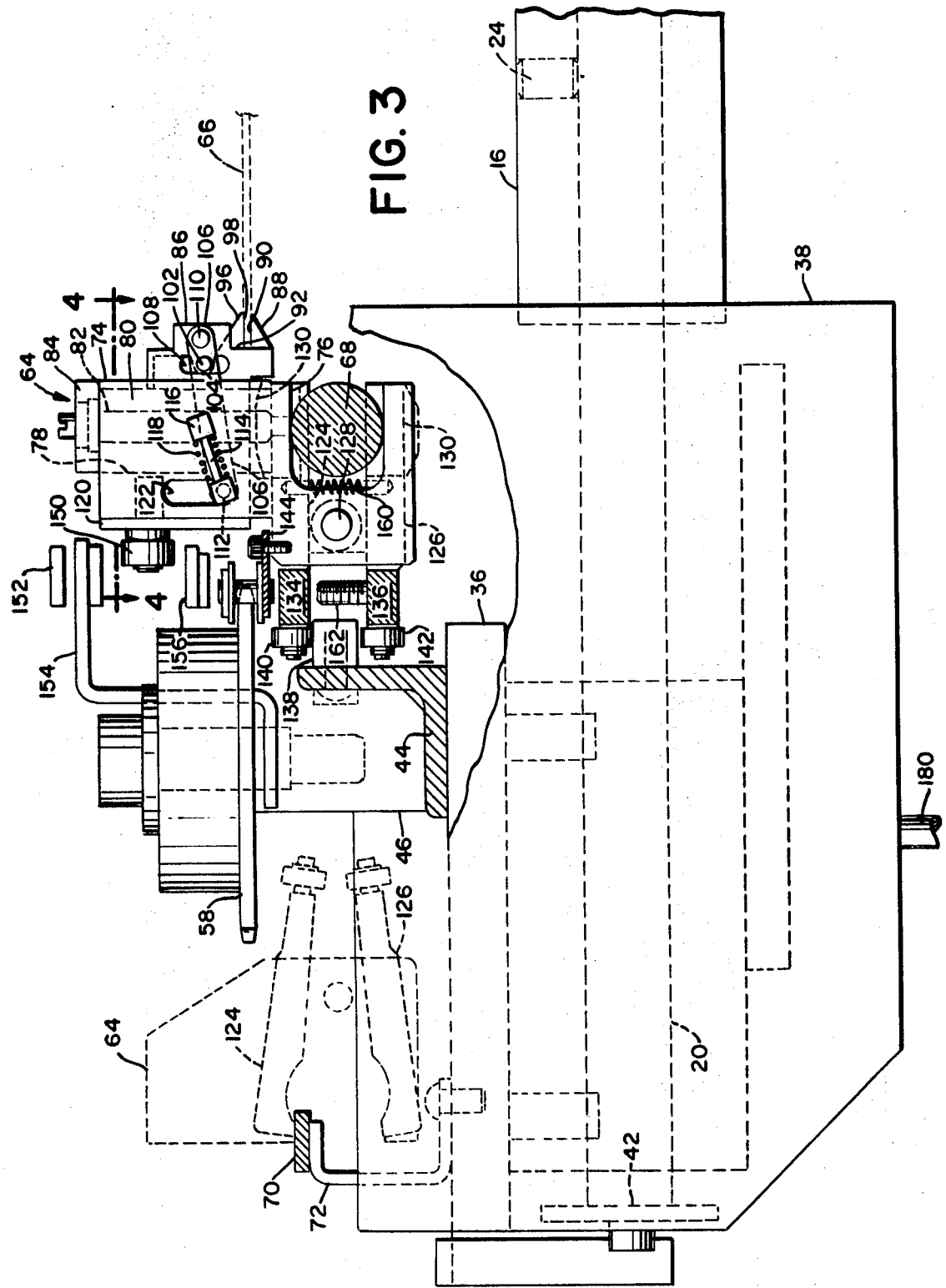

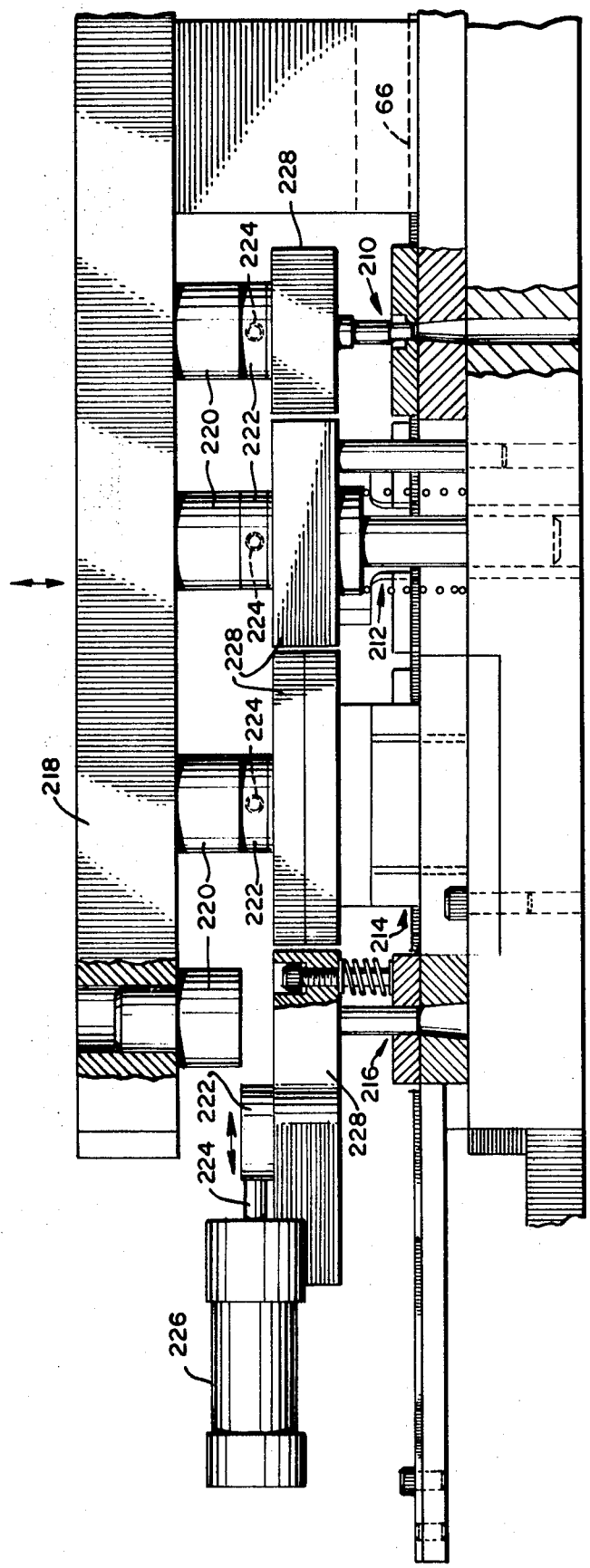

3,606,810
CONTINUOUS STOCK FEEDER
Eugene Kozij, Warwick, R.I., assignor to
Rogers Corporation, Rogers, Conn.
Filed May 28, 1969, Ser. No. 828,500
Int. Cl. B26d 5/30
U.S. Cl. 83—71         13 Claims

ABSTRACT OF THE DISCLOSURE

A continuous stock feeder is presented for feeding strip material from a coil to a machine such as a punch press. The continuous stock feeder has a plurality of chain driven gripper elements which are selectively caused to engage the strip material and advance the material in a programmed manner into the working machine. The grippers are jaw type elements spaced about a continuous chain, and the gripper elements are caused to be mounted on a guide bar when the jaws are in engagement with the material to be advanced. A programmed control such as a numerical punch tape may be employed to selectively advance the grippers and selectively actuate the working machine so that continuous advancement of the material and proper actuation of the working machine are coordinated.

BACKGROUND OF THE INVENTION

(1) Field of the invention

This invention relates to the field of stock feeder mechanisms. More particularly, this invention relates to the field of controlled mechanisms for continuously feeding stock material to a working machine by the use of jaw type clamp or gripping devices which grip the edge of the material and cause the material to be advanced as the grippers are advanced.

(2) Description of the prior art

The need for effective mechanisms for continuously feeding strip material from a coil to a working machine has long been recognized. This need has become more significant and critical with the advent of numerically controlled working machines, i.e., working machines which may be programmed and controlled by punched tapes which, in conjunction with magnetic or electrical control apparatus can be employed to program the operation of the working machine in any desired manner. The supply of material in proper sequence to such numerically controlled working machines is critical for the proper operation of such machines, and the proper automatic supply of stock material to manually operated machines is also an extremely desirable objective. Heretofore, the most common approach in the prior art to provide continuous stock feeding of a strip of material from a coil has involved the use of one or pairs of opposed rolls between which the strip of material is caused to pass. The opposed rolls grip the material passing therebetween and rotate in opposite directions to cause the material to be advanced through the rolls. This common prior art approach, however, possesses several significant deficiencies or disadvantages which makes this prior art approach unacceptable for many applications. For example, serious misalignment problems can result from canting or skewing of the material as it passes through the rolls, and wear of the rolls themselves or nonuniform thickness of the material itself can result in misalignment of the material passing through the rolls. In addition, the rolls tend to cold-work the material as it passes between the rolls, and such cold-working is totally unacceptable in many situations. These disadvantages and many others are overcome by the present invention.

SUMMARY OF THE INVENTION

In the present invention the continuous advancement of a strip of material from a coil to a working machine is accomplished by the use of a plurality of jaw type gripper elements which engage one edge of the strip of material. The gripper elements are mounted on and evenly spaced about a continuous chain which is driven in accordance with a predetermined program. Several of the grippers are always in engagement with the edge of the strip of material, and the material is caused to advance in programmed increments as the chain is driven by the programmed source. As the chain advances, the forwardmost active engaged gripper, i.e., the one most advanced in the direction of movement of the chain, is disengaged from the material and another gripper is brought into engagement with the strip at the other end of the array of active grippers.

One of the jaws of each gripper is movable, and that movable jaw is cam actuated both for engagement and disengagement of the material. A guide bar positioned in the direction of desired movement of the strip of material is spaced from the edge of the strip of material. Bronze jaws at the sides of each gripper move into an active position for engagement with the guide bar, and each gripper element, when active, is thus mounted on the guide bar to assure continuous proper direction of movement. These jaws are disengaged from the guide bar as the gripper element is deactivated by disengagement from the strip of material.

The working machine to which the strip of material is fed, e.g. a punch press, is programmed to have its punching operation coordinated with the programmed advancement of the material. Because of the closely controlled movement of the strip of material which can be achieved with the present invention, both in direction of movement and in incremental advancement, the punch press can employ several punching stations in a tandem arrangement thus greatly increasing the output of the working machine and eliminating the need for complex turret and indexing mechanisms heretofore usually found in multiple operation punch presses.

Accordingly, one object of the present invention is to provide a novel and improved stock feeder mechanism.

Another object of the present invention is to provide a novel and improved stock feeder mechanism for continuously feeding a strip of material from a coil to a working machine such as a punch press.

Still another object of the present invention is to provide a novel and improved continuous stock feeder mechanism capable of accurate programmed numerical control and coordination with a programmed working machine.

Still another object of the present invention is to provide a novel and improved continuous stock feeder mechanism wherein stock feeding is accomplished by a plurality of aligned gripping elements which engage the edge of a strip of material for incremental advancement thereof.

Still another object of the present invention is to provide a novel and improved continuous stock feeder mechanism wherein the material to be advanced is engaged by a number of movable gripper elements which are engaged and disengaged from the material as they move in the direction of desired movement of the material.

Other objects and advantages will be apparent and understood to those skilled in the art from the following detailed description and drawings.

BRIEF DESCRIPTION OF THE DRAWINGS

In the drawings, wherein like elements are numbered alike in the several figures:

FIG. 1 is a top plan view of the stock feeder mechanism of the present invention with some of the elements omitted for the sake of clarity.

FIG. 2 is a front elevation view of the apparatus of FIG. 1.

FIG. 3 is a side elevation view of the apparatus of FIG. 1 with details of gripper elements added thereto and shown in a partial section along line 3—3 of FIG. 4A.

FIG. 4A is a top plan view showing a gripper element mounted on a guide bar.

FIG. 4B is a plan sectional view taken along line 4—4 of FIG. 3.

FIG. 7 is a view showing a tandem punch press arrangement in accordance with the present invention.

DESCRIPTION OF THE PREFERRED EMBODIMENT

Figure 6:
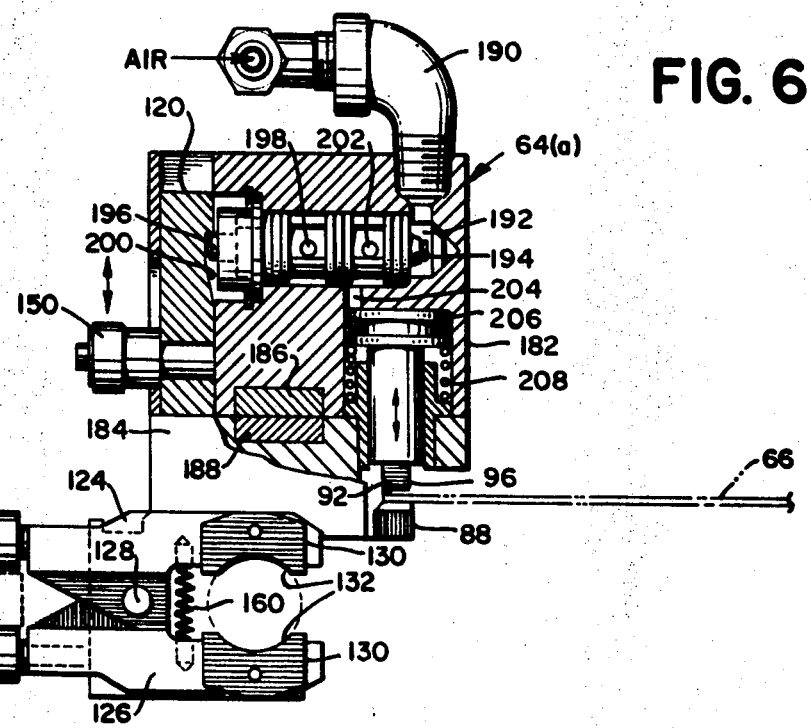
FIG. 6 is a view showing an alternate configuration for the gripper device for the present invention.

Referring now to FIGS. 1 and 2, the general arrangement of the elements of the present invention can be seen. A bed 10 which may be of any convenient size or shape provides a fixed support. Bed 10 may be based or grounded in any convenient manner such as either by being mounted directly on a floor or by being attached to the base of other associated machinery such as a punch press. A pair of brackets 12 and 14 are fastened to bed 10 at opposite ends thereof, and blocks 16 and 18 are joined, such as by welding, to the sides of brackets 12 and 14, respectively. Cylindrical shafts 20 and 22 are mounted in central openings in each of blocks 16 and 18, and the shafts are held in place, respectively, by retaining screws 24 and 26 which pass through the blocks and engage the shafts. The other ends of shafts 20 and 22 are mounted in ball bushings 30 so that the ball bushings can move axially with respect to shafts 20 and 22 with a minimum of friction. The ball bushings are in turn mounted in block housings 32 and 34 which are in turn fixed, by welding or otherwise, to a table 36. Side plates 38 and 40 are also fastened to table 36, and block housings 32 and 34 may also be fastened to side plates 36 and 40, respectively. In view of the arrangement of elements just described, it can be seen that table 36 and side elements 38 and 40 can be moved as a unit in the direction of the axes of shafts 20 and 22. A retainer, such as a ring 40 may be provided at the end of each of shafts 20 and 22 to limit the outward movement of table 36 and prevent disengagement of the table from the support shafts 20 and 22, and thus the position of table 36 and any structure mounted thereon can, if desired, be adjusted.

An L-shaped bracket 44 (see also FIG. 3) is mounted on table 36, and a pair of shaft housings 46 and 48 are mounted thereon such as by screw mountings. One or both of the housings may be movable, and for purposes of illustration housing 48 is shown provided with a pair of elongated openings 50 through which its screw fastening elements pass, and an adjustment screw 52 is provided at one end of housing 48. The position of housing 48 can thus be adjusted by varying the extension of adjusting screw 52. Shafts 54 and 56 are rotatably mounted in housings 46 and 48, and chain sprocket wheels 58 and 60 are fixed to these shafts. A continuous chain 62 extends between and around the outer portions of sprocket wheels 58 and 60, and a number of gripper units 64 are connected to individual link elements in the chain. Only two of such gripper elements have been shown in FIG. 1 for purposes of illustration only, and these gripper elements have been shown only in general outline form in FIG. 1. However, it will be understood that these gripper elements 64 are distributed entirely around chain 62 at uniformly spaced locations so that there are preferably at least ten of such gripper elements. It will be understood that ten elements are specified only as a preferred arrangement, and more or less could be employed as desired; however, it is preferred to have at least 10 so that four can always be in active engagement with the material to be fed. A distribution of ten will thus provide four elements in alignment on the inboard side of the chain and in engagement with a strip of material 66, and the remaining six will be disengaged from the strip of material with one of each being at the curved ends of the chain and the other four being aligned on the side of the chain removed from material strip 66. When the gripper elements are activated to be engaged with material strip 66 they are brought into mounting engagement with a guide rod 68 which is mounted in end plates 38 and 40 and is aligned with the nearest edge of material strip 66. Rod 68 extends in the desired direction of motion of strip 66 and provides a rigid motion guide. When the gripper elements are deactivated and disengaged from material strip 66 they are also disengaged from rod 68 and are allowed to rest on a track 70 which is mounted on table 36 by a plurality of brackets 72. Chain 62 is driven through a gear (not shown) mounted on top of shaft 54 and a drive worm (not shown) on the rotor of an electric motor (not shown). The motor may be selectively actuated in accordance with a control program such as a numerical punch tape and associated apparatus.

Referring now to FIGS. 1, 2, 3 and 4A and 4B, and with particular attention to FIGS. 3, 4A and 4B, the details of construction and operation of the gripper elements will be described. Referring to FIG. 3 (wherein the gripper element 64 and the parts directly connected thereto are as will be seen in a view taken along line 3—3 of FIG. 4A) and also referring to FIG. 4A and 4B, each gripper element 64 has a main casing 74 which has an upper rectangular segment and a lower segment which has a U-shaped recess 76 to allow the casing to be mounted on guide rod 68. The upper rectangular section of casing 74 has a recess 78 in which a block 80 is positioned, block 80 being secured to the lower part of the casing by a through bolt 82 which threads into the lower part of the casing just above recess 76. A cover plate 84 is mounted on top of casing 74 to retain block 80 and cover recess 78 (the plate 84 being removed in FIG. 4A). A projection 86 from block 80 includes a lower jaw element 88 having a gripping surface 90 and a rear positioning surface 92. Projection 86 has a central T-shaped opening 94 in which a movable jaw element 96 is positioned for reciprocating motion with respect to fixed jaw 88, jaw 96 having a gripping surface 98 opposed to gripping surface 92 of fixed jaw 88.

In operation, as will be more fully described hereinafter, jaws 96 and 88 grip the edge of a strip of material to be advanced, with the edge of the material being located against positioning surface 92. Jaw 96 can be moved up and down to release and grip the material, while jaw 88 is stationary. However, the position of jaw 88 can, if desired, be adjusted up or down by adjustment of the position of block 80 in recess 78.

Upper movable jaw 96 has a T-shaped guide segment 100 which is free to ride up and down in T-shaped opening 94, and it will be observed that the T-shaped opening 94 extends through the outer end of projection 86 to accommodate the upper movement of jaw 96. A pin 102 sits in a knotch 104 in guide segment 100, and pin 102 extends completely through projection 86 and guide 100 is mounted in a pair of arms 106, one each of which is on either side of projection 86, and a vertical groove 108 in each side of projection 86 accommodates vertical movement of pin 102. Each of the arms 106 is pivotally connected to projection 86 by a through pin 110, and pivotal movement of arms 106 clockwise or counterclockwise with respect to pin 110 will cause pin 102 to engage either the upper or lower surface of knotch 104 and thus result in upward or downward movement, respectively, of T-guide 100 and jaw 96.

To accomplish the pivotal action of arms 106, the other end of each arm is connected to a pin 112, and each end of pin 112 is connected by a rod 114 to pins 116 on either side of block 80. The pins 116 are rotatably mounted in the sides of block 80, and a compression spring 118 extends between end mount blocks at each of the respective ends of pins 112 and 116. A sliding block 120 is positioned in the rearward portion of block 80, and pin 112 passes through block 120. Block 120 is movable vertically up and down with respect to block 80, and an elongated vertical opening 122 at each side of block 80 accommodates vertical movement of pin 112. As will be more fully described hereinafter, block 120 is cam actuated for vertical movement, and this vertical movement of block 120 results in a corresponding upward or downward movement of pin 112 whereby arms 106 are rotated to cause upward or downward movement of jaw 96. Springs 118 serve to provide a toggle or snap action wherein pin 112 is snapped to one end or the other of opening 122 during the movement of the pin, and it can be seen that the resultant movement of jaw 96 is a quick movement either straight up or straight down.

Referring now to the lower section of gripper element 64, it has been stated above that this lower segment is mounted on guide rod 68 when the gripper elements are active. This mounting is accomplished by positioning recess 76 about guide rod 68 as shown in FIG. 3, and then by bringing bronze jaws into engagement with guide bar 68. Two pairs of upper and lower arms 124 and 126 are pivotally connected by a pin 128 to the lower section of casing 74, and each of the arms has a bronze jaw element 130 mounted thereon, which jaws have arcuate gripping surfaces 132 for sliding engagement with guide rod 68. Each of the pairs of upper and lower arms 124 and 126 are joined by bridging elements 134 and 136, respectively, so that the upper and lower pairs of arms move in unison. Reference is also made to the lower part of the structure shown in FIG. 6 for another view of the arms and jaws. It will be understood that there are four of the jaws 130 which engage rod 68, these jaws serving to mount the gripper element on guide rod 68 while at the same time allowing sliding movement with respect to rod 68 so that rod 68 serves as a guide to insure true lineal motion of the gripper elements when mounted on the guide rod and being activated for gripping engagement with the strip of material 66.

Since arms 124 and 126 are pivotable, a provision must be made for separating the rear ends thereof so that the jaws 130 perform their gripping function. To that end, a cam bar 138 extends substantially between the midpoints of shafts 54 and 56, the top and bottom surfaces of cam bar 138 being slightly sloped toward the center at each end. When a gripper element is in the active position, rollers 140 and 142, rotatably pinned to bridges 134 and 136, engage the upper and lower surfaces of cam bar 138 to keep the rear ends of arms 124 and 126 separated and thus causing engagement between jaws 130 and guide rod 68. Each of the gripper elements 64 is connected to a link of chains 62 by a bracket 144 screwed to the lower part of casing 74.

In the operation of the structure described thus far, controlled electrical signals would be delivered to the drive motor whereby shaft 54 would be caused to rotate in a counterclockwise direction to drive chain 62. An alternative driving arrangement could be accomplished by making rod 68 rotatable and threading it along its length. Mating threads could then be provided on jaw surfaces 132, and the threaded engagement between the rod and the jaws could move the gripper elements. However, the driving arrangement described through shaft 54 is preferred. The amount of movement to be imparted to the chain would, of course, depend on the program being performed and would be coordinated with the punching or other working operation to be performed so that a desired incremental movement of strip 66 could be accomplished. As has been stated above, several of the gripper elements 64 are in engagement with the strip 66 at all times, and the gripper elements come into engagement and depart from engagement as chain 62 is advanced.

Assume, for purposes of illustration and description, that a gripper element 64 is positioned as shown in FIG. 1 on the side of chain 62 removed from rod 68 so that this gripper element is in the inactive state wherein it is disengaged from rod 68. This gripper element is shown in outline schematic form on the left-hand side of FIG. 3 wherein it can be seen that the arms 124 and 126 have been pivoted to bring their rear ends toward each other, and the forward end of arm 124 rides on track 70 to prevent the arms from flopping around. As chain 62 is advanced, this gripper element proceeds around sprocket wheel 58 and approaches guide bar 68, and this gripper element is thus approaching the active position wherein it will be mounted on rod 68 and brought into gripping engagement with strip 66.

When the gripper element has advanced around the outer portion of sprocket wheel 58 to the point where the axes of rollers 140 and 142 are approaching a perpendicular disposition with respect to rod 68, the forwardmost arms 124 and 126 leave track 70 and loosely engage opposite sides of guide rod 68, and continued advancement of the chain brings recess 76 into alignment with rod 68, and then the trailing pair of arms 124 and 126 leave track 70 and also loosely engage rod 68. At this point, the axes of rollers 140 and 142 are approximately perpendicular to rod 68 and are also approximately perpendicular to a line between the centers of shafts 54 and 56. Rollers 140 and 142 engage the sloping end surfaces of cam bar 138, and further advancement of the chain brings rollers 140 and 142 into engagement with the top and bottom surfaces of cam bar 138 to spread apart the rear ends of arms 124 and 126 and thus bring jaws 130 into clamping engagement with guide bar 68. At this stage the arms 124 and 126 are in the position shown in FIG. 3.

As a gripper element comes around the outer periphery of sprocket wheel 58 to assume the position just described for arms 124 and 126, block 120 is in an up position wherein pin 112 is positioned at the top of opening 122 and is held there by the toggle or snap action of spring 118. Arms 106 are thus rotated clockwise and jaw 96 is held in a raised position. As the gripper element moves into position for jaws 130 to engage rod 68, lower jaw 88 swings in under material strip 66 so that lower gripping surface 90 is under the bottom surface of material strip 66. The strip of material is simultaneously urged against positioning surface 92 by one or more rollers 146 which are mounted on a plate 148 which is in turn secured in any convenient fashion to bed 10. The rollers 146 and plate 148 are shown in dotted line in FIG. 1 for ease of illustration, but it will be understood that the upper surface of plate 148 is approximately level with the upper surface of strip 66, and rollers 146 protrude slightly beyond the inward edge of plate 148 to engage the outer edge of strip 66 and thus urge strip 66 against the positioning surface 92 of each gripper.

Continuing now with the description of the operation of the gripper element, a roller or cam follower 150 is fastened to and extends from movable block 120, and this roller is, along with block 120 initially in a raised position above that shown in FIG. 3. As the gripper element approaches its active position, the top of roller 150 engages the lower surface of a downwardly sloping cam 152 (see also FIGS. 1 and 2), which cam is held in position by a bracket 154 mounted on housing 46. Cam 152 forces cam follower 150 and movable block 120 downward as the gripper element is advanced from right to left to pass along the downward slope and under the lower part of cam 152. This downward movement of block 120 carries with it pin 112 which then snaps into the bottom of opening 122 whereby arms 106 are rotated counterclockwise and upper jaw 96 is driven straight down. The downward movement of jaw 96 brings gripping surface 98 into engagement with the upper surface of strip 66, and the inward edge of strip 66 is thus firmly grasped and held by jaws 88 and 96 while being urged against positioning surface 92. The gripper element is thus in the fully active position wherein the jaws 130 are slidably engaged with rod 68 and the jaws 88 and 96 grasp the edge of strip 66.

As the chain is caused to advance in programmed incremental steps, the gripper element slides with respect to rod 88 while the gripping engagement between the jaws and strip 66 causes strip 66 to be moved from right to left in incremental steps and in true alignment. Of course, it will be apparent that a continuous advancement could be employed rather than a timed incremental advancement.

As has been previously stated, several of the gripper elements, preferably four, are in the active position of being mounted on rod 68 and in gripping engagement with strip 66. As a gripper element approaches sprocket wheel 60 it must become deactivated, i.e. disengaged from the strip 66 and rod 68 to again travel around track 70 and then back to another active position. To that end, a cam 156 is positioned at the approach to sprocket wheel 60, cam 156 being held by a bracket 158 mounted on housing 48. As a gripper element approaches cam 156, the lower surface of follower 150 passes over the top of the level portion of cam 156 and then engages the upper surface of the upwardly sloping portion whereby follower 150 and hence movable block 120 are driven upward. The upward movement of block 120 brings pin 112 up with the resultant clockwise movement of arms 106 whereby jaw 96 is moved straight up to release the edge of strip 66. At, or at approximately the same time, rollers 140 and 142 engage inwardly sloping upper and lower surfaces of cam bar 138. A spring 160 to the right of pivot 128 urges arms 124 and 126 apart so that the front ends of the arms move away from each other and the rear ends of the arms move toward each other as rollers 140 and 142 move across these sloping end surfaces of cam bar 138 and then disengage from cam bar 138. This movement of the arms releases jaws 130 from guide bar 68 and the gripper element is thus entirely disengaged and deactivated so that it then moves away from bar 68 and strip 66 as the chain continues to advance. An adjustable screw 162 limits the movement of the rear ends of arms 124 and 126 toward each other to prevent unnecessary movement, and the upper arms then engage track 70 (as shown on the left side of FIG. 3) to start the return trip for eventual re-engagement and reactivation.

A full cycle of operation has thus been described wherein the gripper elements move from an inactive position to an active position wherein several are simultaneously mounted on bar 68 and engaged with strip 66 and then sequentially disengaged after moving the strip in a programmed manner.

Figure 5:
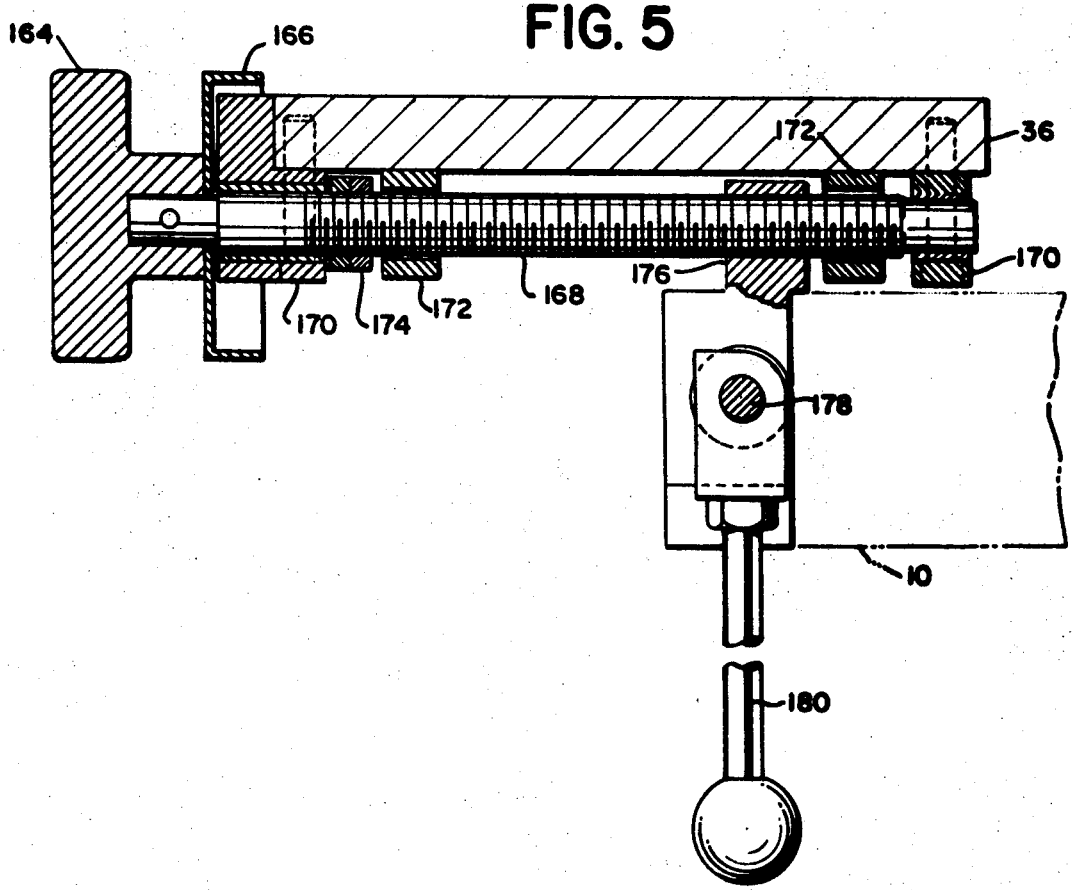
FIG. 5 is a view showing details of an adjusting mechanism for positioning the apparatus of the present invention.

Table 36, and thus the entire chain and sprocket assembly and the gripper elements and rod 68 can be moved in and out along the axes of shafts 20 and 22 so that different widths of strip material can be accommodated. The adjustment is accomplished by an adjusting knob 164 on which is mounted a calibrated wheel 166. Details of the adjusting mechanism are shown in FIG. 5. Knob 164 is connected through a threaded shaft 168 which is rotatably supported in bearings 170, the bearings 170 being fastened to table 36. Additional support brackets, such as those indicated at 172 may also be employed, and shims 174 may also be employed to limit the motion of table 36 in either direction. Threaded shaft 168 is threadably engaged with a split nut 176 which is fastened to table 10. A screw 178 is threadably connected to the two sections of split nut 176 (also see FIG. 2) and an actuating handle 180 is pinned to screw 178. The handle is shown in FIGS. 2 and 7 in the unlocked position wherein rotation of screw 168 in engagement with threads of nut 176 results in movement of table 36. Ninety-degree clockwise rotation (as seen in FIG. 7) of handle 180 causes screw 168 to bring together the two halves of nut 176 thereby clamping the nut tightly to screw 168 and preventing rotation of threaded shaft 168.

Referring now to FIG. 6, an alternate embodiment of a gripper element is shown, the alternate being designated generally as 64(a). Alternate gripper element 64(a) is pneumatically actuated to accomplish the gripping of material strip 66, and thus it substitutes valving and a piston for some of the elements of the gripper previously described. However, many of the elements of the alternate embodiment are similar to or identical to those in the previously described structure and have been correspondingly numbered. For example, the lower structure, including such elements as arms 124 and 126 and jaws 130, is essentially identical to that previously described. In the embodiment shown in FIG. 6 gripper element 64(a) is composed of an upper segment 182 and a lower segment 184 which are held together by wings 186 and 188 which are connected, respectively, to the upper and lower segments and extend beyond the sides of the upper and lower segments and are held together at the extensions by screw fasteners (not shown). An air supply line 190 communicates with a chamber 192 in which is located a spool valve 194, the left end of which butts against an actuating button 196. The air pressure on the right end of spool valve 194 can be relied upon to urge the valve to the left which is the inactive position, or, if desired, a spring can also be employed. In the leftward position of valve 194 (as shown in FIG. 6) the air is vented or ported to any suitable destination through port 198. When it is desired to actuate the gripper to grasp the edge of material strip 66, cam follower 150 is driven upward carrying with it slidable block 120. In the embodiment of FIG. 6 the inner side of block 120 is contoured to form a cam 200 which, when block 120 is driven upward, engages button 196 and drives valve 194 to the right whereby air is directed through a port 202 and thence through a passage 204 to the top of a piston 206. The pressurized air on the top of piston 206 drives the piston downward against the force of a spring 208 to cause upper jaw 96 to move toward lower stationary jaw 88 and thus into engagement with the top of strip 66 to grip the strip between jaws 96 and 88. As will be understood, the jaws 96 and 98 correspond to the similarly positioned jaws 96 and 98 in the previously described embodiment, although the jaw 96 in FIG. 6 is directly connected to piston 206. When it is desired to move jaw 96 upward, cam follower 150 is driven downward to the position shown in FIG. 6 whereby valve 194 is ported to the left to remove the pressurized air from piston 206, and spring 208 then drives piston 206 upward thereby carrying with it jaw 96 and disengaging the jaw from strip 66. It is to be noted that the upward and downward movement of follower 150 and block 120 to cause engagement and disengagement of jaw 96 are reversed in this embodiment, and thus appropriate repositioning of cams 152 and 156 would be required.

Referring now to FIG. 7, a punch press is shown for use in accordance with the present invention. The punch press has a number of punching stations arranged in tandem consisting of punch and dye sets indicated generally at 210, 212, 214 and 216. The strip of material 66 will be fed to the punch from the continuous stock feeder previously described, and the strip would enter the punch press at the right side of FIG. 7. The punch press has a single reciprocating master plate 218 in which are positioned anvil blocks 220 corresponding to each of the punch and dye sets. A supplemental block 222 is associated with each anvil block 220. Each supplemental block is connected to a reciprocating rod 224 which is driven by an air-operated piston in a cylinder 226. Supplemental blocks 222 are programmed, by selectively controlling the actuating supplies to the cylinders 226 to be in or out of register with their associated anvil blocks 220 in a programmed manner. Master plate 218 moves up and down, as indicated by the double-ended arrow, to accomplish the desired punching operations, and all of the anvil blocks 220 are moved up and down at once along with plate 218. However, the stroke of plate 218 is such that the blocks 228 to which each of the punch elements is connected will not be engaged by the associated anvil blocks 220 unless a block 222 is positioned between a block 220 and a block 228. Thus, as illustrated with respect to dye set 216, the withdrawal of block 222 from the path of anvil block 220 allows plate 218 to reciprocate without activating punch and dye set 216. As illustrated in FIG. 7, only the supplemental block 222 associated with dye set 212 is in position to be engaged by anvil block 220 (the blocks 222 associated with dye sets 210 and 214 being withdrawn in a direction perpendicular to the plane of the paper), and thus only dye set 212 of the four tandem dye sets would be actuated. Accordingly, by appropriately programming the air cylinders connected to each of the supplemental blocks 222, it is possible to selectively actuate the desired punches in a desired programmed sequence, and that programmed sequence is coordinated with the previously described incremental advancement of strip 66 through the stock feeder mechanism so that movement of the strip of stock, actuation of the gripper elements, and actuation of selected punch stations from a tandem array are coordinated by a single numerical punch tape program.

While a preferred embodiment has been shown and described, various modifications and substitutions may be made without departing from the spirit and scope of this invention. Accordingly, it is to be understood that the present invention has been described by way of illustration and not limitation.

What is claimed is:
1. A stock feeder for feeding material to a machine, including:
   a table;
   a plurality of gripper elements supported with respect to said table, said gripper elements being spaced apart and formed in an array, each of said gripper elements having an active condition and an inactive condition;
   a movable jaw in each of said gripper elements, said movable jaw having an active position for gripping engagement with a strip of material, and an inactive position, said active position of said movable jaw corresponding to said active condition of the gripper element and said inactive position of said jaw corresponding to said inactive condition of said gripping element;
   advancing means for moving each of said gripper elements between said inactive position thereof and said active position thereof in a predetermined order;
   actuating means for actuating the movable jaw of a gripper between the active position and the inactive position thereof in accordance with the position of said gripper element;
   guide means for guiding the movement of each of said gripper means in the active position thereof; and
   engagement means on each of said gripper means for selective engagement between each gripper means and said guide means.
2. A stock feeder as in claim 1 including:
   a continuous chain positioned on said table and movable with respect to said table;
   each of said gripper elements being attached to said chain at spaced locations to form said array;
   said advancing means including means for driving said chain.
3. A stock feeder as in claim 1 including:
   a pair of sprocket wheels spaced apart on said table, said chain being mounted on said sprocket wheels and extending therebetween.
4. A stock feeder as in claim 1 wherein:
   said actuating means includes cam means positioned to engage follower means on said gripper element, and cam follower means movably positioned on said gripper element.
5. A stock feeder as in claim 1 wherein:
   each of said gripper elements has a fixed jaw, said movable jaw being movable with respect to said fixed jaw and cooperating with said fixed jaw in the active position of said movable jaw to grasp a strip of material between said movable jaw and said fixed jaw.
6. A stock feeder as in claim 1 including:
   a positioning surface on said fixed jaw for positioning the edge of the material to be fed.
7. A stock feeder as in claim 1 wherein:
   said guide means includes a guide bar positioned in the direction of desired movement of the material to be fed.
8. A stock feeder as in claim 7 wherein:
   said engagement means includes a plurality of guide jaw means connected to said gripper element, said guide jaw means slidably engaging said guide bar in the active position of said gripper element.
9. A stock feeder as in claim 8 including:
   actuating means for moving said guide jaw means into engagement with said guide bar and disengaging said guide jaws from said guide bar in accordance with the position of said gripper means.
10. A stock feeder assembly as in claim 1, and including:
    a working machine positioned to receive material from said stock feeder, said working machine having a plurality of working stations arranged in tandem.
11. A stock feeder assembly as in claim 10 including:
    means for actuating said working stations, the actuation of said working stations and the advancement of said gripper elements being coordinated in accordance with a predetermined program.
12. A stock feeder assembly as in claim 11 wherein:
    said working machine is a punch press and said working stations are punching stations.
13. A stock feeder assembly as in claim 12 wherein:
    said means for actuating said working stations includes block means selectively positioned to deliver a blow to a punching station.

References Cited
UNITED STATES PATENTS 2,557,492  6/1951  Young _____ 226—173UX
2,961,138  11/1960  Kaye _____ 226—173X ALLEN N. KNOWLES, Primary Examiner
G. A. CHURCH, Assistant Examiner U.S. Cl. X.R.
83—549, 572; 226—173